UNITED STATES PATENT OFFICE 2,592,863

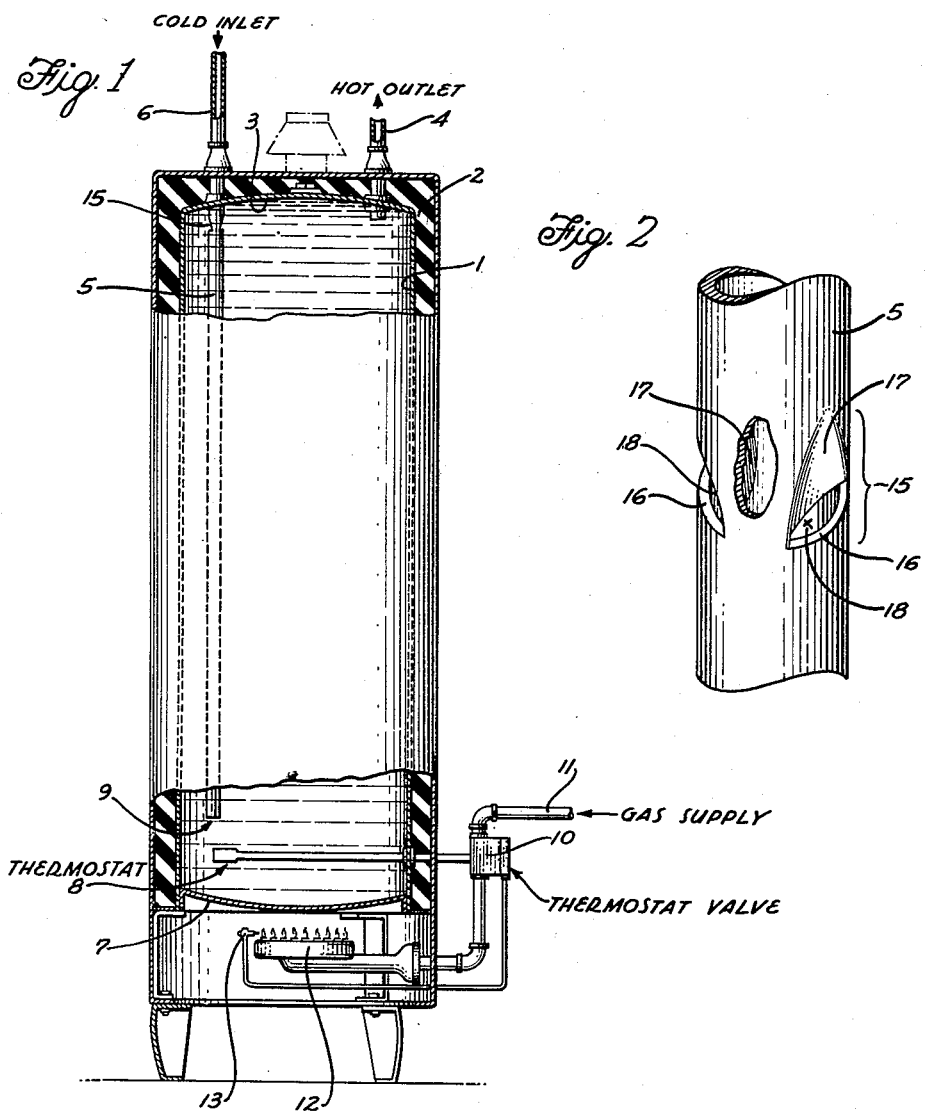

WATER HEATER

Jack S. Conner, Los Angeles, Calif.

Application September 6, 1949, Serial No. 114,135

1 Claim. (Cl. 122—13)

My invention relates to automatic domestic water heaters of the storage type and, more particularly, to a means for reducing stratification in such heaters as a result of short withdrawals when the inlet water is excessively cold.

In general, domestic water heaters utilize an insulated tank heated by gas or electricity. Hot water is drawn from the top of the tank and is replaced by cold water from the mains through a dip tube entering the top of the tank and extending nearly to the bottom of the tank. A thermostat is positioned in the bottom of the tank adjacent the end of the dip tube, and this thermostat is connected to control the tank heater. Usually a small hole is bored in the dip tube near the top of the tank to prevent back siphoning of the contents of the tank when and if the supply main is opened, thereby causing loss of pressure.

Such tanks function well in maintaining a desired temperature differential between top and bottom of the tank on short draws, when the temperature of the main water is relatively high, above 50° F., for example. However, in geographical locations experiencing extended cold weather, the water in the mains may drop to a much lower figure, in some locations as low as 32° F. Under these conditions a water heater such as above described does not function properly when short withdrawals are being made, and particularly when a series of such withdrawals is made.

The reason for this is that the incoming cold water "slugs" the thermostat so that its recovery time for shut-off of the heater is relatively long as compared to the time of withdrawal so that the temperature at the top of the tank rises, increasing the differential temperature between top and bottom of the tank. A series of short withdrawals may add only a cupful or two of cold water to the tank. Hence, if such withdrawals are close together, the heater may remain on continuously. With excessively cold inlet water, it is not unknown for the water at the top of the tank to equal or exceed 212° F., thereby causing the water to flash into steam at the faucet.

One means that has heretofore been utilized to prevent such excessive stratification and overheating is to place a second thermostat in the top of the tank to regulate the maximum temperature to which the tank water can rise. This solution to the problem is satisfactory except from an economy standpoint, as the extra thermostat involves a manufacturing cost of from $7.00 to $10.00 in ordinary household water heaters. In contrast, the present invention, when used in the same type of household water heater, is equally satisfactory but only involves an additional cost of a few cents.

It is an object of the present invention to provide a simple means and method of preventing an excessive temperature rise in single thermostat domestic water heaters under short withdrawals replaced by relatively cold water from the water main.

It is another object of the invention to prevent excessive temperature rise in such a water heater following a series of short withdrawals regardless of the inlet temperature.

It is a still further object of the invention to provide a means for reducing temperature differentials in a storage water heater under short and successive withdrawals, at a minimum cost.

Briefly, my invention comprises a storage type automatic water heater wherein a dip tube discharges cold water adjacent a single thermostat at or close to the bottom of the tank. Some thermostats are outside the tank and depend upon conduction to actuate them. In either case, to prevent slugging of the thermostat by the entrance of relatively cold water from the mains under short draws, I provide an injector, preferably of the Bernoulli type, in the dip tube adjacent the top of the tank, with openings into the tank, preferably proportioned to mix about 10% of the hot water at the top of the tank with the incoming cold water. The water leaving the dip tube and actuating the thermostat will then be at a substantially higher temperature than the temperature of the mains, thereby preventing too great a cooling of the thermostat, and the resulting excessive temperature rise at the top of the tank. A series of short draws will produce an increasing rate of temperature differential. My invention will make the inlet water temperature rise proportional to the rate increase between the top and bottom tank temperatures.

My invention will be better understood by reference to the drawings which show a preferred embodiment of the invention as applied to a gas heated automatic storage water heater.

In the drawings:

Figure 1 is a diagrammatic vertical sectional view, with the pipes and heater shown in elevation, of an automatic water heater embodying my present invention.

Figure 2 is a perspective view of the venturi used in the heater of Figure 1.

Referring to Figure 1, a tank 1 is of the upright type and, for example, of 30-gallon capacity. As is customary, the tank is surrounded by a layer of heat insulation 2. Hot water is withdrawn from the top 3 of the tank through outlet 4. Cold water enters the tank through a dip tube 5 connected to inlet pipe 6, the dip tube entering the tank 1 at once side of the top 3 and extending downwardly to within about eight to ten inches of the bottom 7 of the tank. A thermostat 8 is inserted into the tank 1 through the side thereof, extending, in most such heaters, to a point in the vicinity of the lower opening 9 of the dip tube 5.

The thermostat 8 is connected outside of the tank to a thermostat valve 10 which controls gas from a gas main 11 to a main heating burner 12. Burner 12 is also provided with a pilot 13 supplied through valve 10. As there is a multitude of ways by which heat from the burner can be applied to the water in the tank using inside or outside flues, no particular flue arrangement is shown, as the operation of the invention is not affected by the vent. In like manner most domestic water heaters utilize a thermocouple control of the thermostat valve so that when the pilot flame goes out, the thermostat valve 10 cannot be opened. As this feature also in no way affects the present invention, it has not been shown.

In the dip tube 5, I provide an injector 15 located adjacent the top of the tank, preferably about 2 inches below the top 3. I have found that a simple injector as shown in Figure 2 is satisfactory to inject about 10% of the top hot water in the tank into the dip tube when one household faucet is opened under a normal main of from 50 to 90 lbs. per square inch.

The injector 15 of the Bernoulli type is preferably formed by making opposite saw cuts 16 in the wall of the dip tube and then bending portions 17 of the dip tube above the cuts inwardly to form a venturi constricting the dip tube and at the same time forming water inlet orifices 18. It has been found that the cost of such an injector is only a few cents. It should be noted here that no anti-siphon bore is needed in the dip tube when the injector is used therein, as the orifices 18 perform the same function.

During the passage of the cold water down the dip tube it becomes thoroughly mixed with the injected hot water, and the water discharged from the end opening 9 of the dip tube is appreciably warmer than the water in the mains, thereby preventing slugging of the thermostat even after successive short draws, and making the heater behave exactly as if the cold water entering from the mains were to be significantly warmer. I have also found that the use of the injector as described is in no way detrimental to the operation of the device on long draws such as might be used for filling a washing machine or for showers, etc., and further does not interfere in the least with satisfactory performance of the heater when the inlet water is warmer.

While I have found that an injector mixing about 10% of hot tank water with the cold inlet water is satisfactory for most locations where the inlet water may become excessively cold, injectors using a greater or less proportion of the hot water may be used where inlet temperature conditions warrant such a change.

It is also to be understood that, while I have shown the present invention as applied to a gas fired water heater, it is equally effective when other heat sources are used requiring a thermostat inserted in or connected to the outside of the tank for temperature control.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claim.

I claim:

A cold water inlet for a storage type hot water heater comprising an elongated upright tank, a cold water inlet dip tube entering the top of said tank and sealed thereto and extending downwardly directly exposed to the water of the tank to open adjacent the bottom of said tank, said dip tube adjacent the top of said tank being cut along generally co-planar horizontal lines, with the sides of said dip tube being bent inwardly toward each other just above said cuts, thereby forming a constriction and two openings whereby hot water from the top of said tank is drawn into said dip tube by the Bernoulli effect to raise the temperature of water entering said tank through said dip tube, said constriction and said openings being proportioned to mix about 10% of the water from the top of said tank with water entering said tank through said dip tube.

JACK S. CONNER.

REFERENCES CITED

The following references are of record in the file of this patent:

UNITED STATES PATENTS

| Number | Name | Date |
| --- | --- | --- |
| 1,817,685 | Graham | Aug. 4, 1931 |
| 1,886,135 | Tannehill | Nov. 1, 1932 |
| 2,066,190 | Swars | Dec. 29, 1936 |
| 2,251,426 | Schmid | Aug. 5, 1941 |
| 2,348,901 | Handley | May 16, 1944 |